INVENTORS
Kenyon E. Golding and
William M. Meyer
BY Nobbe & Swope
ATTORNEYS

Sept. 15, 1959 K. E. GOLDING ET AL 2,904,163
METHOD OF AND APPARATUS FOR MEASURING
THE THICKNESS OF SHEET MATERIALS
Filed May 20, 1955 6 Sheets-Sheet 3
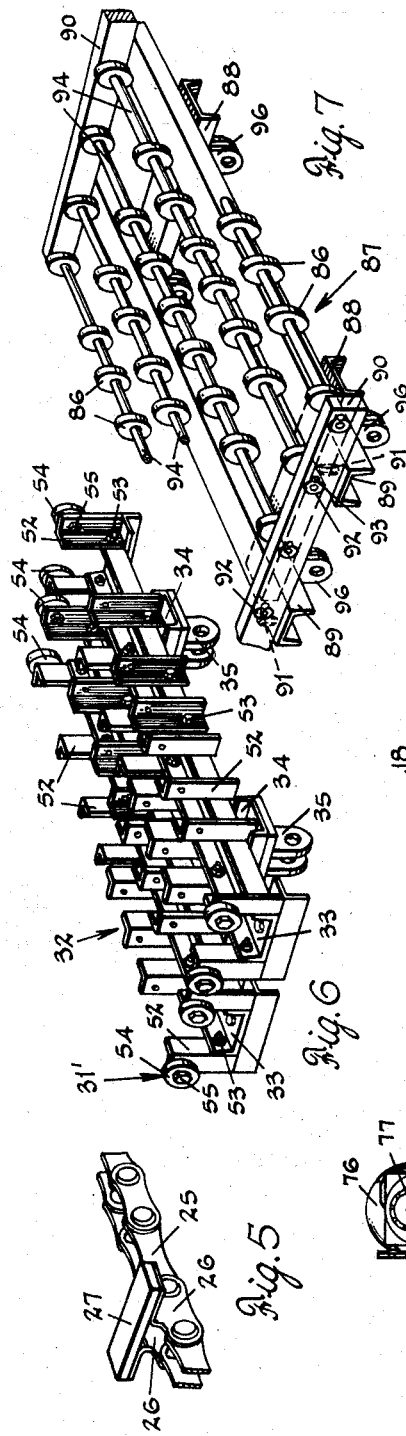
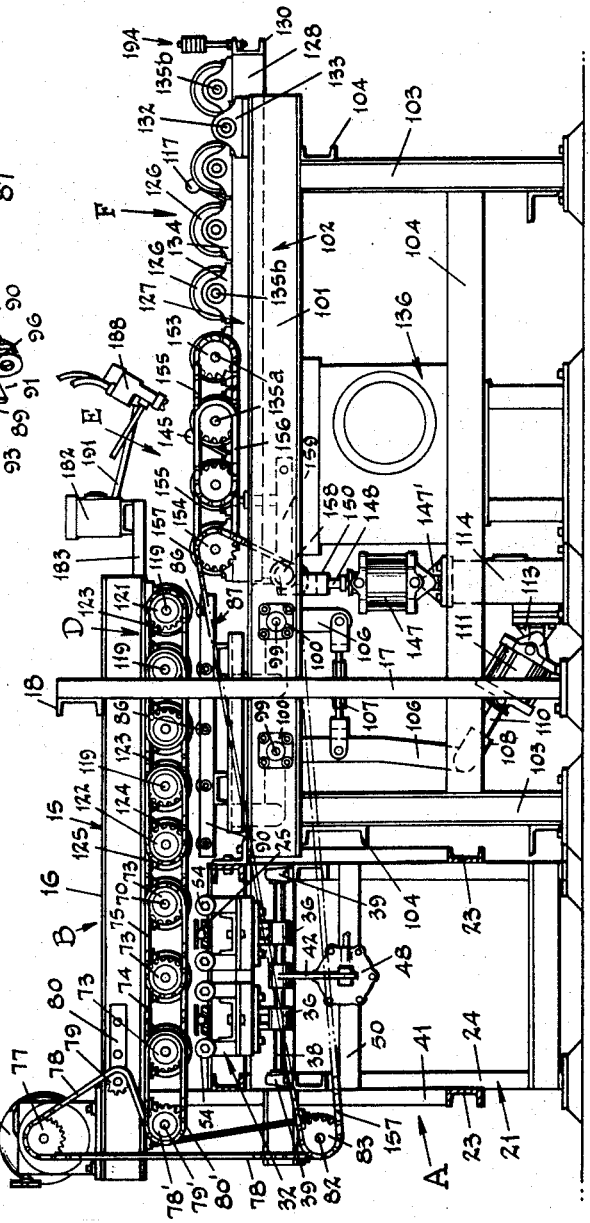
INVENTORS
Kenyon E. Golding and
BY William M. Meyer
Nobbe & Swope
ATTORNEYS

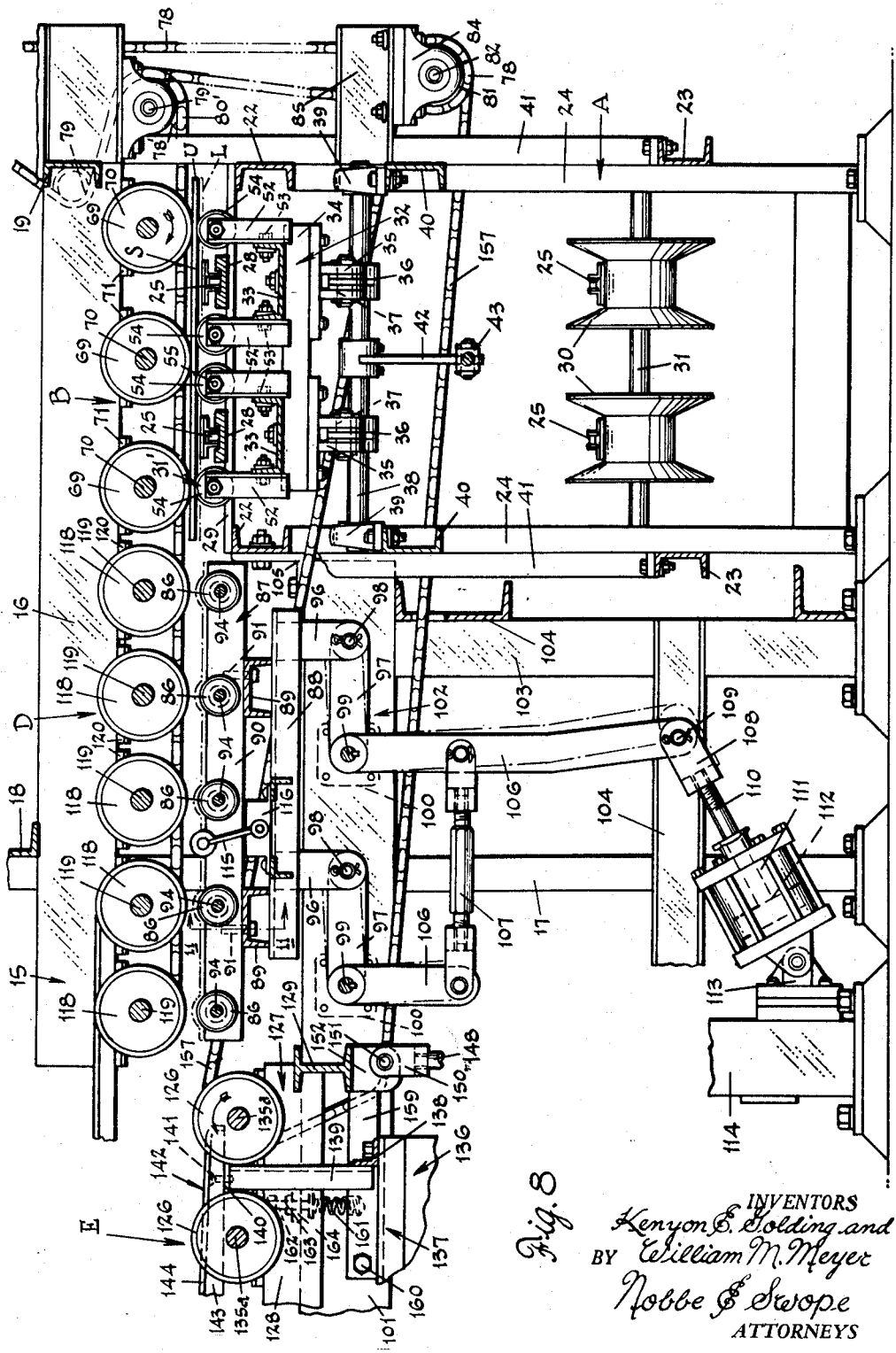

Sept. 15, 1959　　K. E. GOLDING ET AL　　2,904,163
METHOD OF AND APPARATUS FOR MEASURING
THE THICKNESS OF SHEET MATERIALS Filed May 20, 1955　　6 Sheets-Sheet 5

INVENTORS
Kenyon E. Golding and
BY William M. Meyer

Nobbe & Swope
ATTORNEYS

Sept. 15, 1959 K. E. GOLDING ET AL 2,904,163
METHOD OF AND APPARATUS FOR MEASURING
THE THICKNESS OF SHEET MATERIALS
Filed May 20, 1955 6 Sheets-Sheet 6

INVENTORS
Kenyon E. Golding and
BY William M. Meyer
Nobbe & Swope
ATTORNEYS

United States Patent Office 2,904,163
Patented Sept. 15, 1959

2,904,163

METHOD OF AND APPARATUS FOR MEASURING THE THICKNESS OF SHEET MATERIALS

Kenyon E. Golding, Maumee, and William M. Meyer, Perrysburg, Ohio, assignors to Libby-Owens-Ford Glass Company, Toledo, Ohio, a corporation of Ohio Application May 20, 1955, Serial No. 509,872

10 Claims. (Cl. 198—39)

The present invention relates broadly to an improved method and apparatus for determining the thickness of sheet materials and more particularly for measuring the thickness of materials having a uniform surface area.

The method and apparatus to be hereinafter described have been employed to great advantage in the production of glass sheets that previously have been precision cut on pattern templates, which have substantially identical outlines. The glass sheets so cut therefore will contain identical surface areas. However, the weight of a plurality of such sheets will be found to vary one from the other in the event that there is a difference in their thickness. Such differences are attributable to thickness of the glass as it is produced or to the action of the grinding and polishing tools in removing the surface glass to make "plate" glass.

Before measuring a glass sheet according to this invention, an average or required thickness is determined. By computing the weight of a sheet having a surface area defined by a particular outline and of the required thickness, a standard may be obtained and a range of tolerances established within which glass sheets of acceptable weight or thickness can be classified. In other words, any decrease or increase in the thickness of uniformly-sized sheets will be reflected in a decrease or increase in their weight. In order to automatically and rapidly obtain the thickness of each sheet of glass moving in a sequence of production operations, the method and apparatus is therefore employed to determine such thicknesses by interpretation of the individual weight of the sheets and to mark each sheet with an indicia so that they can be selectively sorted into groups of different thicknesses.

The primary object of the invention is accordingly to provide an improved method of and apparatus for measuring the thickness of sheets of material of uniform area and for automatically interpreting such thickness upon the determination of its weight.

Another object of the invention is to provide an improved method and apparatus for automatically handling glass sheets in substantially continuous sequence of motion to rapidly measure the thickness of each individual sheet in relation to its weight and then indicate upon the sheet the range of tolerances into which the sheet may be classified.

Another object of the invention is to provide an improved method and apparatus of the above character wherein means is provided for establishing a plurality of thickness tolerances for sheets of material of uniform size and to indicate visually on such sheets the tolerance range of thickness in which they may be classified and after the thickness thereof has been automatically determined from their weight.

A further object of the invention is to provide, in an apparatus of the above character, a sequentially operating series of conveyors adapted to remove a sheet of material laterally from a line of movement and to convey said sheet into position for measurement of its thickness and to move the sheet from said position while automatically indicating the thickness thereupon.

Other objects and advantages of the invention will become more apparent during the course of the following description when read in connection with the accompanying drawings.

In the drawings, wherein like numerals are employed to designate like parts throughout the same:

Fig. 4 is a side elevational view of the apparatus;

Fig. 5 is a fragmentary perspective view of conveyor chain belt for glass sheets;

Fig. 6 is a perspective view of an elevator framework;

Fig. 7 is a perspective view of a second form of elevator framework;

Fig. 8 is longitudinal vertical sectional view of the forward end of the apparatus as taken on line 8—8 of Fig. 2;

Figs. 8 and 9 taken in conjunction with one another are representative of a longitudinal section through the apparatus in its entirety;

Briefly stated, the apparatus of this invention is particularly well-adapted to the purpose of indicating the thickness of a sheet material, such as glass, plastic, or the like in high-production operations. For the purpose to which it is herein employed, and as will be fully hereinafter described, the apparatus measures the weight of sheets of glass having a common and exact surface area. Such sheets are preferably pattern cut from large blanks of glass and according to a precision template so that any determinable difference will be found to exist in their thickness. This difference between one sheet and another of the same surface area has been found to be caused in fluctuations of the original blank thickness as it emerges as a continuous ribbon from the glass furnace or, in the case of plate glass, from infrequently occurring changes in the amount of glass removed during the grinding and polishing thereof. The apparatus thus reacts to the weights of different pattern-cut sheets of glass, but since they are all identical in surface area, their individual differences of weight may be and are taken as a variance of thickness.

In order that the apparatus may be adapted to high or rapid production operations, it is substantially automatic and, during its operation, functions to optically indicate to the operator the range of thickness within which the sheet may be classified. The indicating means preferably includes a signal for ease of classifying and a legible but readily removable mark on the sheet for more permanent record.

Since, for the purpose of illustration, the invention will be described in connection with sheets of ground and polished plate glass, its utility is for obtaining the thickness of glass in ranges of ten-thousandths of an inch. Taking, as for example, two hundred and fifty thousandths of an inch as a mean or average thickness, tolerances of five or ten thousandths of an inch plus or minus from the average are thus rapidly calculated and, above and below these ranges of tolerance, indications may be made to further denote thicknesses beneath or above these limits. Obviously the control system for such an apparatus is adapted to modification to vary the ranges of tolerance at will.

Figure 1:
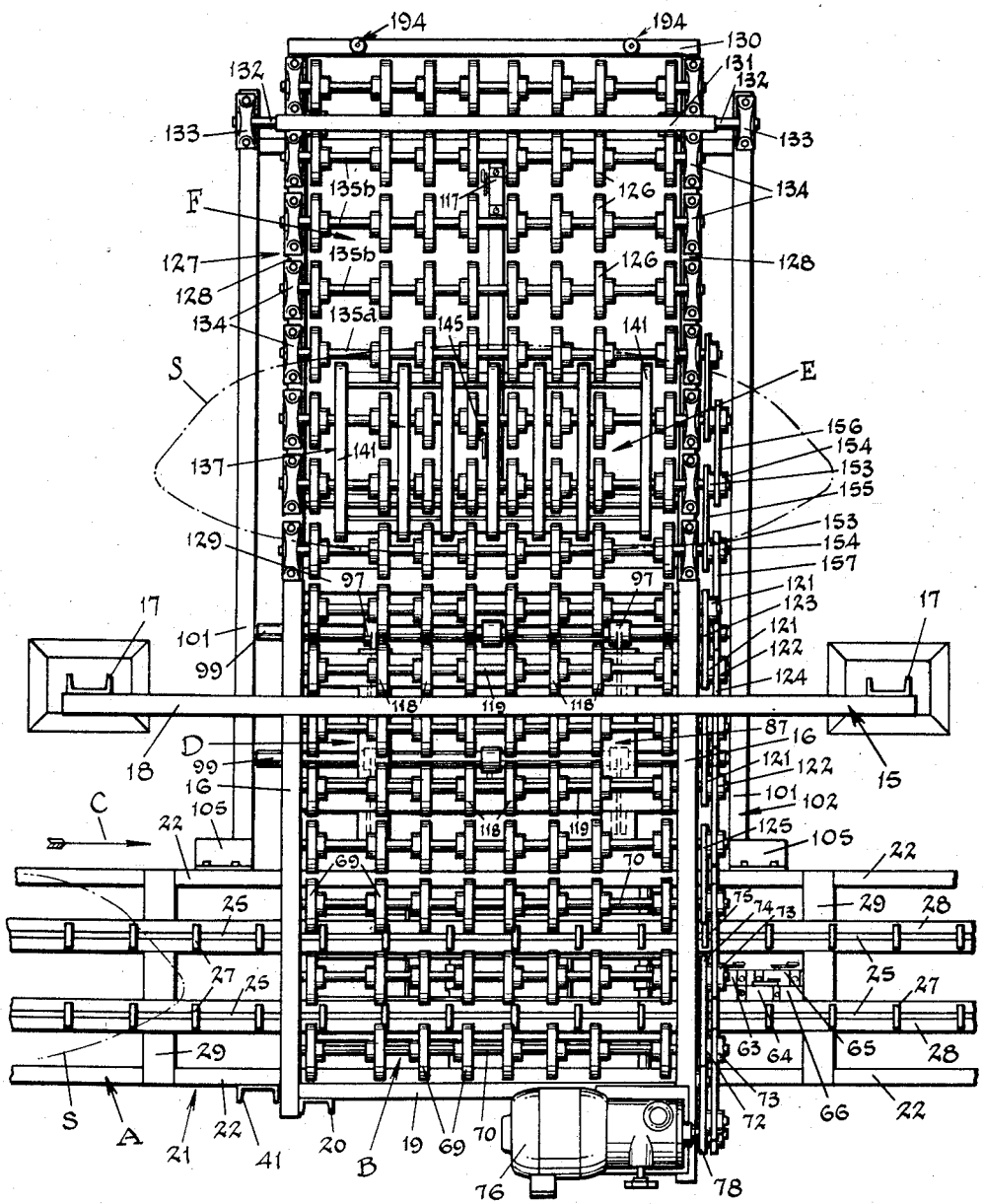
Fig. 1 is a plan view of a thickness measuring apparatus constructed in accordance with the invention.

Referring now to the drawings and more particularly Fig. 1 thereof, the apparatus will be seen to be disposed above a conventional form of production-line conveyor generally designated by the letter A. As constructed in accordance with the invention, the apparatus has an entry section B into which a sheet of glass S, moving in the direction of the arrow C, is carried by the conveyor A. Upon arriving in the entry section B, the sheet actuates suitable controls so that it will be elevated from the conveyor A and carried laterally or transversely of the conveyor's line of movement into an intermediate section D.

In this intermediate section D, further movement of the glass sheet may or may not be arrested according to the position of a preceding glass sheet. That is to say, if a sheet has been weighed in the section E and carried to the rear of the apparatus or the takeoff section F, but not yet removed therefrom, an immediate sheet of glass in section D will be temporarily halted. When this section F is clear, the sheet is immediately carried into the weighing section E and then discharged onto the takeoff section F from which it is removed by an operator. Since the production flow of sheets is normally at regularly spaced intervals, several of such apparatus may be disposed along a conveyor line and provision made in the control system for alternately removing a sheet and then allowing one or more sheets to pass therethrough.

The entry section B and intermediate section D are contained within one framework, generally indicated by the numeral 15, and which includes horizontally disposed channels 16 above the conveyor A and located laterally thereof, and carried by supporting standards 17. The channels 16 are interconnected by channels 18 and 19; the channel 18 being secured adjacent the rearward ends of channels 16 and carried by the standards 17, while channel 19 interconnects the forward end of channels 16 and in turn is supported by upright channels 20 carried by the framework 21 of the conveyor A.

This framework 21 conventionally is formed by horizontally disposed channels 22 and 23 that are supported at regularly spaced intervals along the continuity of the conveyor by standards 24. The mobile elements of the conveyor include a pair of parallel arranged link-belt chains 25 that are equipped with special links 26 (Fig. 5) to which are attached pads 27 of rubber or like material. The chain belts 25 are entrained about suitable power equipment (not shown) and their upper flights are supported by rails 28 which are mounted on bars 29 carried by channels 22 of the conveyor framework 21. As shown in Fig. 8, the return or lower flight of the chain belts 25 may be carried by sheaves 30 having axles 31 suitably journalled on the channels 23 of framework 21.

Within the entry section B, there are arranged a plurality of rollers, generally designated 31', interposed between and on opposite sides of the chain belts 25, said rollers normally being located beneath a horizontal plane formed by the pads 27. The rollers are carried on an elevator framework 32 (Fig. 6) that is adapted to be raised upon the entry of a glass sheet and then lowered after its discharge into the intermediate section D. More particularly, the elevator framework 32 is formed by a pair of channel members 33 disposed in parallel to the conveyor channels 22 and a transversely disposed pair of channel members 34 (Fig. 6). Each of the channels 34 on their lower surfaces have brackets 35 which pivotally receive the ends of levers 36 on axles 37. The opposite ends of levers 36 are fixedly mounted on shafts 38 (Fig. 2) that are journalled at their ends in bearings 39 mounted on cross-channels 40. The cross-channels 40 are supported at their ends by standards 41 affixed to conveyor channels 22 and 23.

Figure 2:
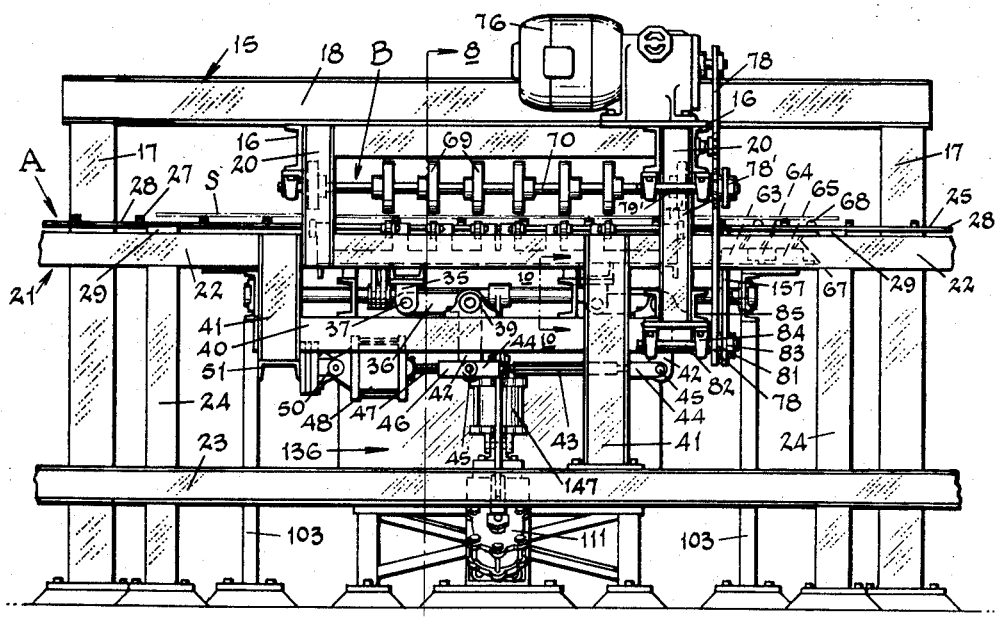
Fig. 2 is a front elevational view of the apparatus.

Interposed between the levers 36 on each of the shafts 38 is an actuating lever 42 fixed to the shaft and depending therefrom (Figs. 2 and 8). The depending ends of levers 42 are interjoined by an adjustable link 43 which is equipped with yoke members 44 which receive axle pins 45 passing through said ends of the levers 42. One of the axle pins 45 also carries the end of a yoke member 46 which is threaded onto the end of a piston rod 47. The cylinder 48, which operates piston rod 47 by means of the contained piston 49, is supported by bracket 50 on the cross-member 51 of the framework 15.

Thus as will be described hereinafter, when pressure to the cylinder 48 produces outward motion of the rod 47, through the link 43, the levers 42 will swing the shafts 38 and levers 36 thereon upwardly and consequently the elevator framework 32 will be raised to elevate the rollers thereon above the plane of the chain-belt pads 27. As shown in Fig. 6, each channel 34 of framework 32 has secured thereto in spaced relation a plurality of upright angles 52 by means of bolts 53. At the upper end of each angle 52, a rubber-surface ball-bearing roller 54 is rotatably carried on a nut and bolt support 55. Refering again to Fig. 8, it will be seen that a row or plurality of rollers 54 will be disposed on either side of each chain-belt 25 and supported for transverse rotation relative to each belt. Also as seen in this figure, the glass sheet S, as shown in full line indicated at U, has been raised from the plane of the chain-belt pads 27 as indicated by the letter L. And when the rollers in their plurality are in their lowermost position as will be seen in Fig. 2, the upper surfaces of their peripheries will be in a plane beneath that of the pads 27 and sheets of glass will pass freely thereover.

Figure 10:
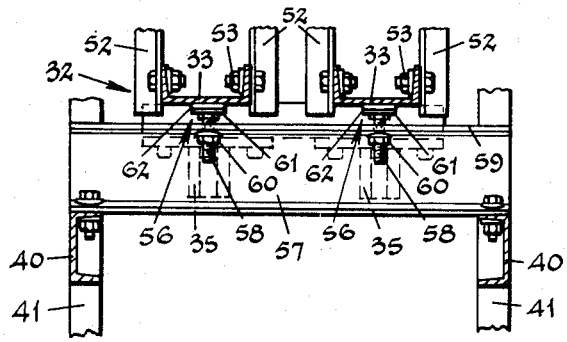
Fig. 10 is a detail view of a support for one of the elevator frameworks and as taken on line 10—10 of Fig. 2.

The lower limit of movement of the framework 32 may be determined by a plurality of stops 56 as shown in Fig. 10 that are adjustably mounted on channels 57 carried by channels 40. Each stop comprises a vertically disposed bolt 58 threaded through the upper horizontally disposed leg 59 of channel 57 and held against rotation by a lock-nut 60. The head of each bolt 58 carries a support plate 61 to the upper surface of which is secured a pad 62 of rubber or like resilient material.

At the rightward side of the apparatus as viewed in Figs. 1 and 2, there are three switches 63, 64 and 65 that are carried on a plate 66 forming a part of the conveyor framework 21. The switches 63, 64 and 65 are each provided with roller supporting arms 67, the rollers 68 thereon being disposed slightly above the plane of pads 27 and in the path of the sheets S carried thereon. The switches 63 and 65, as will be more fully described hereinafter, operate as actuating and alternating switches, to control the functioning of switch 64 which, in the control system, activates the elevator cylinder 48 through suitable valves. The switch 63 therefore operates instrumentalities which open and alternately close a circuit for switch 64; while the switch 65 operates to render the switch 63 alternately operative and inoperative if desired, to permit the free movement of a glass sheet through the entry section B of the apparatus.

However, when the switch 64 is effective, and through its activation of other devices, it causes the framework 32 to be raised and a glass sheet S to be lifted by the rollers 54 into surface engagement with a plurality of driven rubber-surfaced rollers 69 (Figs. 1 and 8). The rollers 69 are fixedly mounted on shafts 70 journalled at their ends in bearings 71 (Fig. 8) that are mounted on the lower horizontally disposed legs of channels 16. Each of the shafts 70 at one of its ends is equipped with one or a pair of sprockets 72 and 73; chain belts 74 and 75 being arranged alternately thereabout as shown in Figs. 1 and 4 to carry a suitable drive from one shaft to the other. The sprockets 72—73 and shafts 70 may thus be driven from a source of power such as the motor-contained reduction unit 76. This unit is mounted on a portion of the framework 15 and drives a sprocket 77 which is connected to the first of the sprockets 73 by a chain-belt 78. As shown in Fig. 4, this chain-belt is trained about the sprocket 77, idler sprocket 79 carried on an adjustable bar 80 mounted on an adjacent channel 16, a sprocket 77' on shaft 79' and about a sprocket 81 (Fig. 2) mounted on shaft 82 on which is also fixedly mounted a second sprocket 83. By sprocket 78' on shaft 79', the chain-belt 80' drives the sprocket 73 on the first shaft 70. The shaft 82 is journalled in bearings 84 supported on brace channels 85 of the framework 15.

Accordingly, when a sheet of glass is lifted by the rollers 54 on elevator framework 32, it will be urged into engagement with the rollers 69 on shafts 70 and, by their driven rotation and the free rotation of the rollers 54, be carried laterally from the conveyor A and into the intermediate section D of the apparatus where it is received on rollers 86 carried by a frame-work 87 while the said framework 87 is in its lowered position (Fig. 8).

Figure 11:
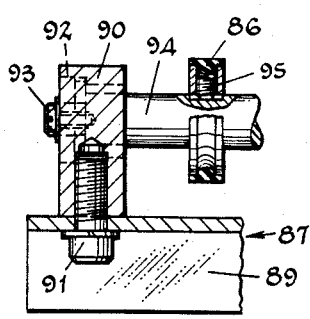
Fig. 11 is a detail sectional view of a portion of the second elevator framework as taken on line 11—11 of Fig. 8.

This framework, as illustrated in Fig. 7, comprises a pair of base channels 88 and channels 89 secured to the upper surfaces thereof, the channels 89 being arranged parallel to the channels 16 of the framework 15, or generally speaking, parallel to the path of glass movement. Adjoining the opposite ends of the channels 89, there are located bars 90 that are secured to said channels by bolts 91 (Fig. 11). Mounted at spaced intervals in the bars 90 are bearings 92, confined in said bars by bolts 93 and in which are journalled the ends of a plurality of shafts 94. The rubber-surfaced rollers 86 are fixedly mounted on the shafts 94 by means of set-screws 95.

The framework 87 is adapted to be raised and lowered, similarly to the elevator framework 32, by means of a controlled cylinder. More particularly, the base channels 88 have brackets 96 depending therefrom in which are pivotally mounted the ends of levers 97 by means of axle pins 98 (Fig. 8). The levers 97 at their opposite ends are fixedly mounted on shafts 99. Each of shafts 99 is journalled at its opposite ends in bearings 100 mounted on horizontally disposed upper channels 101 of a frame 102. The channels 101, which are supported at their ends by standards 103 reinforced by suitable channels 104, may be affixed to the adjoining channels 22 of conveyor frame 21 by suitably bolted angles 105.

Interposed between the levers 97 on each shaft 99 is an actuating lever 106. The levers 106 are interjoined by a yoke and adjustable link connection 107. One of said levers is substantially longer than the other and at its lower end is connected by a yoke member 108 and axle pin 109 to the piston rod 110 of cylinder 111. The cylinder 111 contains a piston 112 and is pivotally mounted on bracket 113 secured to a fixed column 114.

When a glass sheet enters into the intermediate section D and is supported on the plurality of rollers 86, it engages and depresses the roller supporting arm 115 (Fig. 8) of a double action switch 116, carried on the framework 87, while the framework is in its lowermost position. Now, in the event that a preceding sheet of glass has not been removed from the take-off section F, the one side of a double-sided switch 116 is rendered inoperable by a switch 117 located in the section F and, as will hereinafter be described in detail, although one switch side may not complete a circuit therethrough, the opposite side will operate in conjunction with the switch 65. This control of switch 116, in the one instance, will thus prevent the collision of two sheets in the remainder of the apparatus.

However, if the rear of the apparatus is clear, actuation of side *a* of the switch 116 energizes the control circuit for a valve which directs pressure to the cylinder 111 and through the piston rod 110 and levers 97 and 106, the action of the cylinder effects raising of the framework 87 to a position as indicated in phantom line in Fig. 8. When so raised, the rollers 86 urge the sheet S into contact with rubber-surfaced rollers 118 that are continuously driven. The rollers 118 are fixedly mounted on shafts 119 journalled at their opposite ends in bearings 120 carried by the channels 16. Each shaft carries sprockets 121 and 122 (Fig. 1) that are interjoined by alternately arranged chain-belts 123 and 124 trained thereabout, the sprocket 121 on the first shaft 119 adjacent to the last shaft 70 being driven from a sprocket 72 thereon by a chain-belt 125 (Fig. 4). Actually, in the physical construction of an apparatus, the shafts 70 and 119 with their rollers 69 and 118 are of a common construction and are driven in unison through the alternately disposed chain-belts 73—74 and 123—124 and from the power unit 76. However, since it is obvious that the glass sheet in entry section B will first be moved when engaged by the rollers 69 and without engaging the rollers 118 and then by the rollers 118 independently of rollers 69, their sequential movement of the glass sheets has been described as above.

Figure 9:
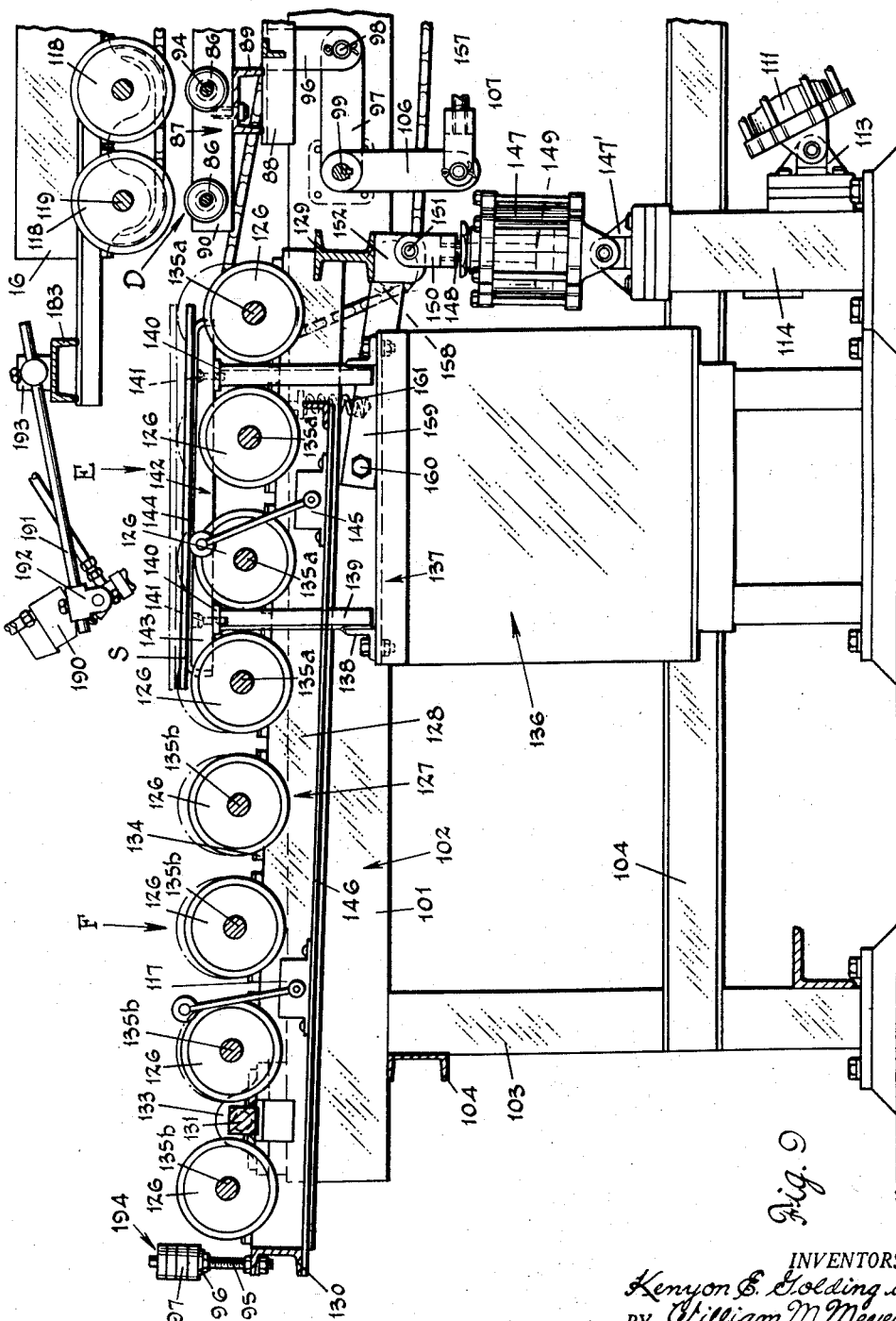
Fig. 9 is a longitudinal vertical sectional view of the rear end of the apparatus as taken on line 9—9 of Fig. 3.

The glass sheet, in being moved from the rollers 86 on framework 87, will be supported in a plane indicated by the phantom line in Fig. 9 and will be carried onto the rubber-surfaced rollers 126 carried by a tiltable frame 127. This frame is formed by side channels 128 and structural members 129 and 130 secured to the ends thereof. Adjoining the rearmost ends of the channels 128 there is a transversely disposed bar 131 (Fig. 1) having cylindrical end portions 132. The bar 131 is affixed, as by welding, to the upper surfaces of channels 128 while the ends 132 operate as supporting axles and are journalled in bearings 133 mounted on channels 101.

As illustrated in Figs. 1 and 9, the channels 128 have bearings 134 mounted thereon and in which are journalled the shafts 135 for rollers 126. In order to carry the glass sheet inwardly toward and outwardly from the weighing or measuring section E and onto the take-off section F, as shown, the first series of half of the shafts, designated 135a, are continuously driven while the last half, or the remainder of the shafts designated 135b may be considered "idler" shafts. The driven shafts 135a are arranged above a measuring instrumentality contained within a box 136.

Figure 12:
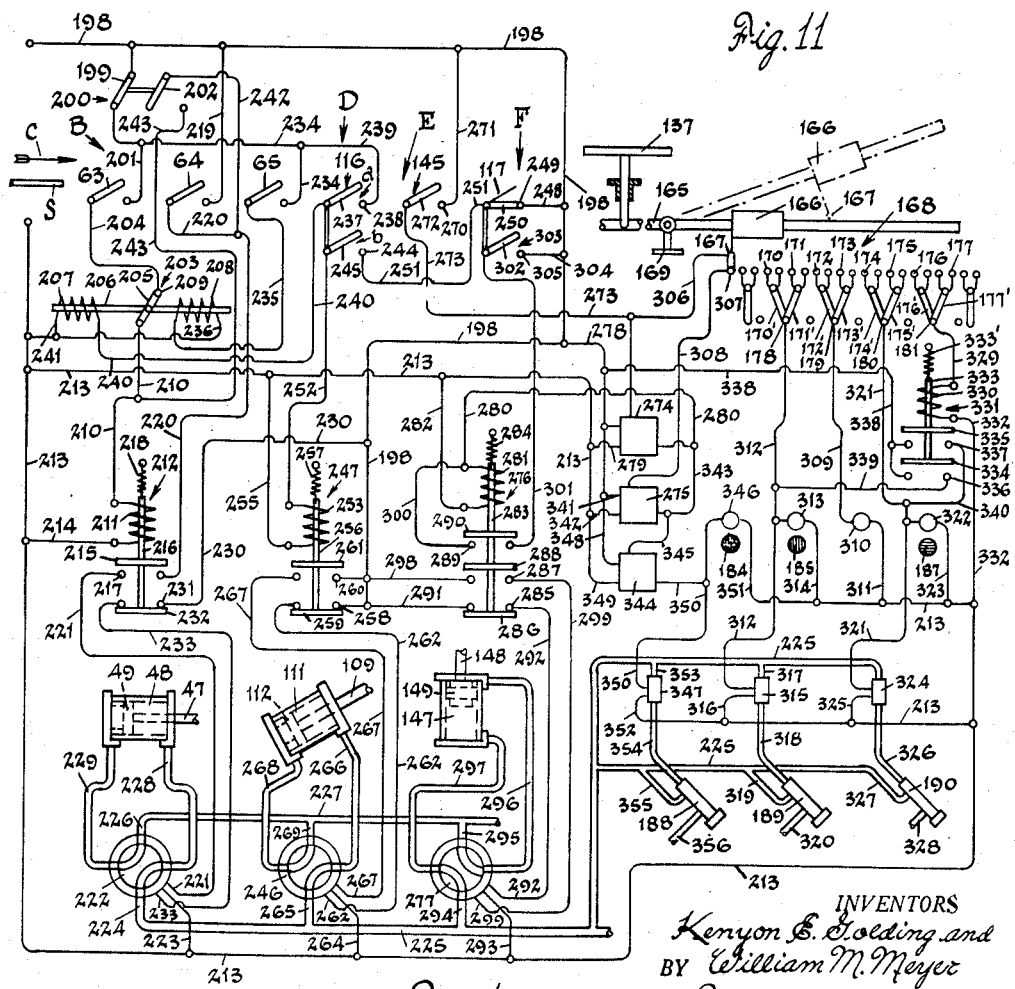
Fig. 12 is a diagrammatic view of the combined electrical and pneumatic control systems.

Since the invention is not directed specifically to the operation of the said instrumentality, this has been broadly delineated in Fig. 12 and will be generally described there in connection with its operation; it being recognized that other and different devices may be used without departing from the spirit of this invention. Thus, carried above and influential in effecting functioning of the measuring instrumentality, is a frame 137 formed by suitable, horizontally disposed angle members 138 (Fig. 8) and having a plurality of uprightly disposed angles 139 arranged along the front and rear sides thereof. At their upper ends, each of angles 139 are provided with an integrally formed pad 140 that is drilled and tapped. Secured by bolts 141 to the pads 140 of each of the opposed pairs of angles 139 are glass receiving support members 142, formed having a base 143 of wood and a cover or soft upper surface 144 as of felt or like resilient materials. Centrally disposed between the driven shafts 135a on the frame 127, a switch 145 is located and is mounted on a bar 146 carried by the frame 127.

The frame 127 is normally disposed in a substantially horizontal plane, being supported at one or its rearward end by the bar 131 and bearings 133 on frame 102 and at the other or forward end by means of a cylinder 147. The cylinder is pivotally supported by means of a bracket 147' mounted on the top or upper surface of the column 114 and the piston rod 148 thereof is operable by the contained piston 149. Said rod 148 carries a yoke 150 at its end which yoke is pivotally attached by pin 151 to a depending tongue 152 secured to the frame crossmember 129. While air under pressure is directed to and normally maintained against the under side of the piston 149 contained in cylinder 147, the frame 127 will be substantially horizontally supported and upper peripheries of the rollers 126 mounted on shafts 135 will be disposed above the plane of the support members 142.

The shafts 135a are equipped at one of their ends with sprockets 153 and 154 (Fig. 4) interconnected by alternately disposed chain-belts 155 and 156, the sprocket 154 on first shaft 135a being interconnected to the sprocket 83 on shaft 82 by a chain-belt 157. Since this chain-belt parallels the adjacent channel 101 of frame 102 and is disposed between said channel and the framework 87, provision is made for preventing interference between the chain-belt 157 and the support shafts 99, extending outwardly from the framework 87 and journalled in the bearings 100 carried by the said adjacent channel 101. For this purpose, the upper flight of the belt 157 is directed over the said shafts between sprocket 83 and first sprocket 154 while the lower flight is trained about an idler sprocket 158. The sprocket 158 (Figs. 4 and 9) is rotatably carried on a bar 159, that is pivotally carried on a bolt 160, secured in channel 101, and constantly urged downwardly by a coil spring 161. The spring 161 may be received in a socketed portion of the bar at its lower end (Fig. 8) and adjustably engaged by a bolt 162 at its upper end. The bolt 162 with a lock-nut 163 is threaded through a plate 164 secured to adjacent channel 101.

The spring acts to maintain a suitable amount of tension in the chain-belt 157 and when the frame 127 is moved downwardly by action of the cylinder 147, operates to maintain a suitable tension as the chain-belt is lowered with the immediate sprocket 154 that it is trained about.

The glass sheet S, upon being carried onto the rollers 126 of frame 127 and operating switch 145, produces the functioning of an electrical circuit which simultaneously performs two operations. When the switch 145 is closed, it completes a circuit to a suitable valve which reverses the direction of pressure to the cylinder 147 to lower the frame 127 and thereby deposit the glass sheet on the support members 142; at the same time, it causes energization of a timing device that is adapted to eventually produce reversal in the direction of pressure to the cylinder 147 in the event that the weight of the glass sheet is not sufficient to produce operation of the weighing instrumentality. The timing device is adjusted to provide a time interval slightly longer than that during which the glass sheet is weighed or measured and discharged onto the take-off section F.

As diagrammatically illustrated in Fig. 12, by way of example, weight of the glass sheet causes the frame 137 to actuate a balanced beam 165 to which it is operatively connected. The beam 165 has associated therewith an adjustably movable balance or counter-weight 166 which carries thereon a contact 167 that is movable into engagement with any pair of a plurality of contacts generally indicated at 168. The beam 165 may be pivotally supported as by the trunnions 169.

The contacts 168 may be of any conventional design and, for the purpose of illustration, are shown as being arranged in pairs, each pair having a common switch arm in order that various tolerances can be determined and relation of the contacts adjusted to respond according to an increment of weight of the glass sheet or the variance of the weight from an average. This average, of course, as previously mentioned, may be an averaged standard of glass thickness as of two hundred and fifty thousandths of an inch (.250"). Thus, pairs of contacts 170 and 171 may be conventionally adjusted to respond to the weights of glass sheets having a low range of thickness from two hundred and thirty-five thousandths of an inch (.235") to two hundred and forty-five thousandths of an inch (.245"); the pairs of contacts 172 and 173 responding to an average range of tolerance as from .245" to .255" of an inch; the pairs of contacts 174 and 175 responding to a higher range of tolerance of thickness as from .255" to .265"; and the pairs of contacts 176 and 177 responding to the weight of glass sheets above .265 of an inch.

As conventionally shown herein in Fig. 12, each pair of contacts 170 to 177 inclusive, is equipped with a switch arm, which for convenience is correspondingly numbered 170', 171', etc., so that, upon separation of the switch arms from their positions as shown, each pair of contacts will be adapted to denote tolerance ranges of thickness in the order of .005 of an inch. Also if the switch arms are disposed to provide other combinations, the ranges of tolerance can be shifted upwardly or downwardly from those described. As herein shown, however, the switch arms 170' and 171' are commonly engaged at contact 178; the switch arms 172' and 173' at contact 179; the switch arms 174' and 175' at contact 180 and switch arms 176' and 177' at contact 181.

Figure 3:
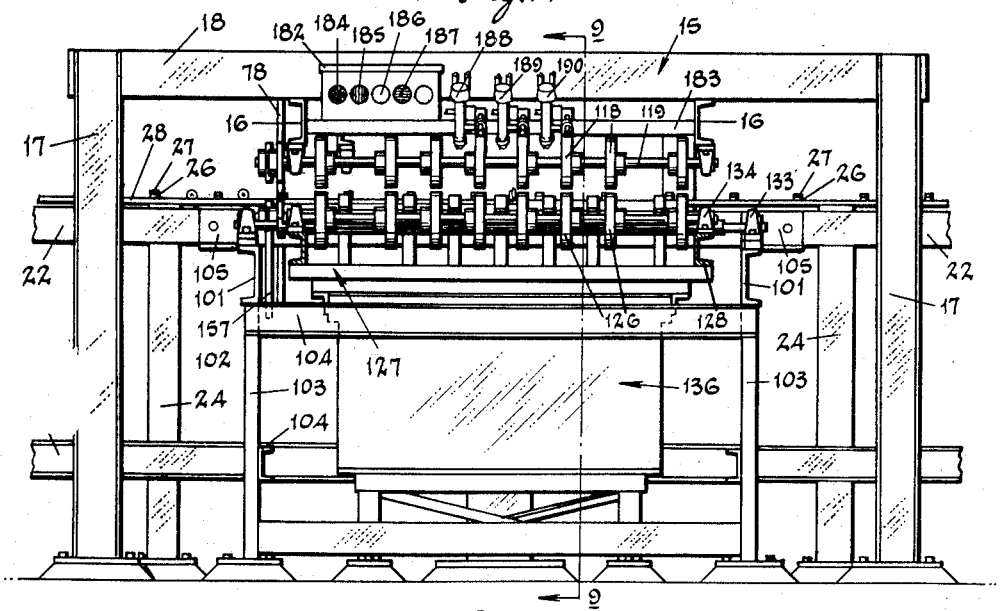
Fig. 3 is a rear elevational view of the apparatus.

Each of contacts 178 to 181 inclusive completes a circuit to energize a signal lamp and the control valve of a conventional spray gun. As shown in Fig. 3, a lamp box 182 is mounted on a channel 183 carried generally by the channels 16 at their rearmost ends. The lamp box 182 contains any suitable number of bulbs that will illuminate lenses mounted in one wall thereof. These lenses may be of any suitable color and are of, for example, yellow as at 184; red as at 185; clear as at 186; and blue as at 187. Parallel circuits are also provided to operate a plurality of spray guns 188, 189 and 190. Each spray gun is, as shown in Fig. 9, carried by a rod 191 by means of an adjustable bracket 192, the opposite end of the rod 191 being mounted in an adjustable bracket 193 secured to the channel 183. Preferably the spray guns are inclined to direct a small stream of water-soluble dye onto the glass surface at the same time that their commonly connected bulbs are lighted. Accordingly, when the yellow lens 184 is illuminated to indicate that the glass sheet is too light in weight or in other words too thin, the spray gun 188 will produce a yellow dye area on the glass. When the red lens 185 is illuminated to indicate the thickness of a glass sheet between .235 and .245 of an inch, the spray gun 189 will produce a corresponding color area of red on the glass surface; and when the blue lens 187 is illuminated, the spray gun 190 will likewise produce a blue color area to denote that the sheet has a thickness of between .255 and .265 of an inch.

To indicate that the sheet has a thickness between the tolerance of .245 and .255 of an inch, the clear lens 186 is illuminated and no color dye is sprayed on the glass. However, when the thickness of a glass sheet exceeds the high tolerance of .265 of an inch, the lenses 185 and 187 are both illuminated and both of the spray guns 189 and 190 are operated to simultaneously produce color areas of red and of blue.

When the thickness of the glass sheet has thus been determined, the pressure directed to cylinder 147 is reversed and the piston rod 148 operates to raise the tiltable frame 127. As the rollers 126 thereon engage the glass and lift it from the support members 142, the fact that they are continuously driven, by the shafts 135a on which they are mounted, will move the sheet onto the rollers 126 of idler shafts 135b. In order that the motion of the sheet will not carry the same beyond and off from the area of shafts 135b, a pair of stops 194 are located at the rear of the frame 127. These stops are mounted on the cross-member 130 of the frame 127 and each may consist of a vertically fixed spindle 195 having a support plate 196 and number of rubber collars 197 thereon.

In order that the sequence of events may now be carefully reviewed and the operation of the measuring apparatus set forth in connection with the combined pneumatic and electrical system thereof, reference is now made to Fig. 12. As mentioned above, each sheet of glass S has a surface area that is substantially uniform with other sheets, all of the sheets being pattern cut on template cutting machines so that their outlines are identical and the surface area capable of being calculated to a standard in square feet and increments thereof. By way of example, one pattern may have a surface area of 6.70 square feet and, with a predetermined thickness of .250 of an inch, a standard weight of 20.33 pounds. Obviously the areas of different pattern outlines will vary and accordingly the weight of a glass sheet so pattern cut will differ. Having determined the weight of a glass sheet having a standard or average thickness, the system of the measuring apparatus can be adjusted so that, for each uniform pattern size, a range of tolerances will be determinable both below and above the standard thickness and these tolerances interpolated from the differing ranges of weight of varying sheets.

Now, as a sheet S is delivered to the apparatus by the chain-belts 25 of the line conveyor A, it passes through the entry section B thereof until the leading end engages and closes the switches 63, 64 and 65. At this time, the sheet is substantially centered or balanced above the elevator frame 32. The switch 63 is connected to one side of an electrical power source by line 198 through the normally closed side or bar contact 199 of switch 200 by line 201. The switch 200 may be manually operated, when desired, to open side 199 and close the normally open side 202. Switch side or bar contact 202 controls direct operation of the circuit system initiated upon closure of switch 64, as will later be described. When the bar contact 199 is closed, however, closure of switch 63 will begin a circuit from line 201 to a double solenoid-action switch 203 by line 204.

The arm 205 of switch 203 is movably carried by the armature 206 of solenoids 207 and 208. As presently shown, the arm 205, engaging fixed contact 209, will complete a circuit from line 204 to line 210 and the solenoid 211 of relay switch 212, thence to the opposite side 213 of the supply circuit by line 214. The bar contact 215 carried by the armature 216 is normally held from engagement with the fixed contacts 217 by a spring 218 acting to retract the armature. When the solenoid 211 is so energized, the armature will be urged to carry bar contact 215 into temporary engagement with contacts 217. This will complete a circuit through closed switch 64 by line 219 from source supply 198 and lines 220—221 to one side of an electrically operable four-way valve 222 and thence by line 223 to opposite source 213. The valve 222 is connected by conduit 224 to a supply pipe 225 of air under pressure and by conduit 226 to an exhaust line 227 therefor. The valve is also connected by conduit 228 to the forward side of cylinder 48 and by conduit 229 to the rear end thereof.

Normally, however, the valve is controlled by a circuit to direct air pressure to the forward side of the said cylinder to maintain the framework 32 in its lower position as determined by the stops 56. This circuit is maintained by line 230 from supply source 198, the normally closed contacts 231 and 232 (the contact 232 being carried by the armature 216) line 233 to valve 222 and thence by line 223 to the opposite supply source 213. Thus, when the solenoid 211 is energized, the contacts 215—217 will be engaged while the contacts 231—232 are disengaged and the valve 222 will be reversed. This action will direct air pressure through conduit 229 to the rear end of cylinder 48 against piston 49 therein. This will operate to raise the framework 32 and by the rollers 54 thereon lift the glass sheet from the chain-belts 25 and against the continuously driven rollers 69 to remove the sheet laterally from the line conveyor A and entry section B of the apparatus to the rollers 86 on the framework 87 in the intermediate section D wherein the sheet engages the arm 115 of switch 116. When the sheet is so removed from the entry section B by elevation of the framework 32, it allows opening of the switches 63, 64 and 65.

The switch 65 is connected by line 234 to source 198 through line 201 and side 199 of switch 200 and controls the function of the solenoid 208 by line 235, the circuit being completed to opposite source 213 by line 236. Thus, when the switch 65 is temporarily closed, the solenoid 208 will be energized to move or hold the armature 206 to maintain the switch 203 closed. And this permits functioning of the relay switch 212 as above described. However, when the sheet has been removed from the vicinity of the framework 32, the opening of the switches 63, 64 and 65; first, deenergizes the solenoid 211 of switch 212 to cause contacts 215—217 to open the circuit through lines 220—221 to valve 222 and re-establish the circuit of lines 230—233 upon re-engagement of contacts 231—232 as the armature 216 is retracted by spring 218. Upon closure of the lines 230—233, the valve 222 is reversed to redirect pressure to the forward end of cylinder 48 by conduit 228 and exhaust from the rear end by conduit 229, these conduits now being connected through said valve to the air supply conduit 225 and exhausting conduit 227. Opening of switch 64 opens the circuit of lines 219 and 220 to contacts 217. Lastly when the switch 65 is opened, the circuit to solenoid 208 is disconnected between lines 234 and 235.

Now as the sheet is moved into the intermediate section D and engages the switch 116, two circuits are created. On the switch side $a$ or by the switch arm 237, a circuit is established at contact 238 by line 239 from line 234 and by line 240 to solenoid 207 and thence by line 241 to the opposite source 213. When energized, the solenoid 207 actuates armature 206 to remove switch arm 205 from contact 209 thereby opening the circuit between lines 204 and 210 to solenoid 211. This will render the normal functioning of the switch 64 ineffective between lines 220 and 221 since the solenoid 211 cannot be energized upon closure of the switch 63. Consequently when a second sheet passes through the entry section B of the measuring apparatus, the closure of switches 63 and 64 will have no functional effect on the cylinder 48 or the framework 32 elevated thereby and this will allow the second sheet to be carried by the chain-belt 25 to a second measuring apparatus. However, upon closure of switch 65, the circuit completed though lines 234—235 will re-energize solenoid 208 and this will produce reclosing of the switch 203 by the armature 206. The subsequent entry of a third sheet into the section B will then produce the necessary operations to cause its removal into the intermediate section D of the first apparatus wherein of course it will again produce a repeated closure of contacts 237 and 238 to repeat a holding cycle. Removal of glass sheets to be measured for thickness may thus be carried out in an alternative manner of operations in a first or second measuring apparatus. In fact, by the provision of additional control devices, any number of such apparatus may be used.

In the event that one apparatus is to be employed, the bar contact 199 of switch 200 is opened and bar contact 202 is closed. Opening of side 199 breaks the circuit between lines 198, 201 and 234 to render switches 63, 65 and the contacts 237—238 of switch 116 ineffective. Switch side or bar contact 202 by line 242 from line 220 and line 243 though line 210 to solenoid 211 will permit the function of the cylinder 48 to be effected upon the closure of switch 64 with the entry of every sheet into the apparatus. Accordingly, upon momentary closure of switch 64, the solenoid 211 by armature 216 will establish the connection of lines 220—221 at contacts 215—217 and open the connection of lines 230—233 at contacts 231—232. As above described, removal of the sheet from the framework 32 will of course produce a reversal in the closed and open circuits. Direct or sequentially alternate operation of the measuring apparatus may thus be controlled as desired.

Continuing with the arrival of a sheet S on the framework 87, closure of the switch 116 also closes the side $b$ or contacts 244—245 to normally complete a circuit to one side of a valve 246 through a relay switch 247. Closure of the switch 116 to effect operation of valve 246 is dependent on the condition of normally closed switch 117 which as previously described is located in the take-off section F of the apparatus and subject to being opened in the event that a glass sheet is not removed therefrom. With the rear end of the apparatus clear, however, a circuit will be completed by line 248 from the supply side 198, through contacts 249—250 of switch 117, line 251 to contacts 244—245 and line 252 to the solenoid 253 of relay switch 247 and thence by line 255 to opposite supply side 213. When energized, the solenoid 253 activates armature 256 against spring 257 to open a circuit through contacts 258—259 and establish a circuit through contacts 260—261.

Contacts 258—259 normally complete a circuit from supply line 198 to line 262 to one side of the valve 246 and thence by line 264 to opposite source side 213. When so controlled, the valve, by conduit 265 connected to air pressure supply pipe 225 and by conduit 266 to the forward end of cylinder 111, maintains the framework 87 in its lower position; however, when the circuit of lines 198—262 is broken at contacts 258—259 and the contacts 260—261 are engaged, the valve is reversed. Contacts 260—261 complete a circuit from line 198 to line 267, to valve 246 and by line 264 to the side 213. This circuit reverses the valve to connect conduit 265 to conduit 268 and rear of cylinder 111 and conduit 266 from the forward end to conduit 269 on the exhaust side 227. The framework 87 will now be momentarily raised so that the sheet will be engaged by the driven rollers 118 and conveyed to the weighing section E. Upon release of switch 116 to open the circuit of solenoid 253 between lines 251 and 252, the spring 257 operates to retract the armature 256 thereby opening contacts 260—261 and reclosing contacts 258—259. This will effect a reversal of pressure through valve 246 since a circuit through lines 198—262 will be resumed and air pressure will be directed through conduits 265—266 with exhaust through conduits 268—269 to operate cylinder 111 thereby immediately lowering the framework 87 into position to receive a subsequent sheet S.

As the glass sheet is removed from the intermediate section D, or more particularly, by the rollers 86 on framework 87, it is carried onto the rollers 126 of the frame 127 and, as previously pointed out, since the rollers 126 on shafts 135a are continuously driven the sheet will be propelled thereover as it engages and closes switch 145. The contact 270 of switch 145 is connected by line 271 to supply line 198 so that when switch arm 272 is engaged therewith, a circuit will be carried by line 273 to timing relays 274 and 275. Relay 274 is preferably adjusted to maintain a closed circuit for an interval of, for example, two seconds of time, adjustably more or less, while the relay 275 is adjustably timed to create a closed circuit for an interval of, for example, four or five seconds. The relay 274 thus controls the functioning of a solenoid actuated relay switch 276 to actuate a valve 277 controlling the cylinder 147 while relay 275 monitors the time interval during which a glass sheet will be supported on the frame 137 in the event that it is not of sufficient weight to product operation of the measuring instrumentality contained in box 136 or, more particularly, depress the beam 165, schematically described as located therein.

Accordingly when the timing relay 274 is activated by a circuit through line 278 from line 198, its return being by way of line 279 to the opposite side 213, a circuit from supply line 198 will be completed by line 280 to solenoid 281 of switch 276 and thence by line 282 to opposite source 213. When energized, the solenoid 281 actuates armature 283 against spring 284 to open and close a plurality of contacts 285—286, 287—288, 289—290. The bar contact 285 and fixed contacts 286 are normally closed to complete a circuit by line 291 from supply line 198 to line 292 connecting to one side of valve 277 thence by line 293 to the opposite side 213.

The valve 277 is connected by conduit 294 to pressure side 225 and conduit 295 to the exhaust side 227; also by conduit 296 to the upper end of cylinder 147 and by conduit 297 to the lower end thereof. While contacts 285—286 are engaged, the valve directs pressure through conduit 297 and against rear or under side of piston 149 to support the frame 127 in its horizontal or uppermost position. However, when the valve 277 is actuated, the pressure from conduit 294 is directed through conduit 296 to move the piston 149 downwardly and lower the said frame. Temporarily then the cylinder is connected by conduit 297 to exhaust conduits 295 and 227.

The normally open fixed contacts 287 and bar contact 288, when engaged by action of the armature 283, complete a circuit from supply line 198 by line 298 to line 299 to the opposite side of valve 277 and thence by line 293 to the opposite side 213. This circuit reverses the position of the valve to connect pressure conduit 294 to conduit 296 and the upper end of cylinder 147 and exhaust conduit 295 to conduit 297. The frame 127 accordingly is lowered; the upper surfaces of the peripheries of rollers 126 dropping beneath the planes of the support members 142 and the bar 159 under the influence of spring 161 descending to maintain the sprocket 153 in mesh with and preventing any slack to exist in the chain-belt 157.

The closure of fixed contacts 289 and bar contact 290 normally completes a circuit by lines 300 and 301; line 300 being connected to line 280 while line 301 is connected to bar contact 302 of a second switch device 303 operably associated with the sheet engageable switch 117. The switch 303 may be employed if desired to insure against collision of glass sheets in the take-off section F since the actual weighing and measuring operation is comparatively instantaneous in duration. Therefore to prevent a sheet from being moved from the section E, or from the frame 137, while a sheet remains on the rear end of the frame 127, the switch 117 will prevent movement of succeeding glass sheets either from either of the frameworks 87 or 137. While this switch 117 is actuated, the switch 303 thereof will maintain the solenoid 281 energized by line 304 from supply line 198 to contact 305 and by switch arm 302 to line 301 to hold the frame 127 in its lowered position and even after the termination of the timed control exerted by either of the relays 274 or 275.

However, when the frame 127 is lowered, the glass sheet is deposited on the support members 142 of frame 137 and its weight, if average or thereabout, will be effective to actuate the beam 165 and swing the same on its pivotal support 169. The end thereof carrying the balance or weight 166 will be swung upwardly, as diagrammatically indicated, and a conventional means (not shown) will be activated to move said weight along the beam until a balance can be effected. According to the present invention, the weight 166 carries the contact 167 that is attached by line 306 to line 273 from switch 145 and as a balance is brought about, the contact 167 will be located to engage one of the pairs of contacts 170 to 177, inclusive, according to the poundage of weight.

The contact 167, when the beam 165 is in its idle position, normally engages a fixed contact 307 connected by line 308 to the timing relay 275. The circuit to relay 275 through lines 273, 306 and 308 will be thus opened at contacts 167 and 307 when the beam 165 is actuated by a sheet of suitable weight. The relay 275 is therefore rendered inactive during a normal measuring operation.

If a glass sheet has a weight that has been computed as average for a uniform pattern-cut area—that is to say, between .245 and .255 of an inch, the contact 167 will be located so as to engage either of the pair of contacts 172—173 which by their switch arms 172' or 173' will create a circuit from supply line 198 and line 306 through contacts 167, 172—173 and 179 and line 309 to activate the lamp bulb 310 behind the clear lens 186 to denote that by reason of its weight, the thickness of the glass sheet is between .245 and .255 of an inch. The lamp circuit is completed by way of line 311 to opposite side 213.

Substantially simultaneously with the illumination of lamp bulb 310, the timing relay 274 becomes inactive and opens the circuit to the solenoid 281 between lines 198 and 280. The spring 284 immediately retracts the armature 283 to close contacts 285—286, open contacts 287—288 and contacts 289—290. This reverses the direction of pressure through the valve 277 to direct pressure by conduit 294 to cylinder 147 by conduit 297 to raise the frame 127 thereby lifting the sheet S by means of rollers 126 from the support of frame 137 and, since the rollers are continuously driven, move the sheet rearwardly onto the rollers 126 of idler shafts 135b until it engages the stops 194. When the sheet enters this take-off area F, it engages the control arm of switch 117 to produce the opening of one side thereof, or, more particularly, open the normally closed switch contacts 249—250 and close the normally open switch contacts 302—305. This, as above pointed out, will prevent activation of the solenoid 253 through switch contacts 244—245 of switch 116 located in the intermediate area D or, more particularly, on the framework 87, the switch 116 thereon being depressed when a glass sheet is removed from the line conveyor A and onto the rollers 86 of framework 87.

Also, in the event that the glass sheet is not removed, the closed contacts 302—305 of switch 303 will re-energize the solenoid 281 by the line circuit 304, 301, contacts 289—290 of switch 276 and line 300 when a subsequent sheet enters weighing section E and closes switch 145. Obviously, through the above-described circuits and upon cessation of timing relay 274, the contacts 289—290 will complete a holding circuit to the solenoid 281.

Should the glass sheet by reason of its thickness, have a lesser weight than the predetermined average, the beam 165 will only be lowered sufficiently to cause balancing movement of the weight 166 until the contact 167 thereon is positioned to engage either of pairs of contacts 170—171 when a balance has been effected. Now by line 306 through contact 167 and either of the switch arms 170' or 171' to contact 178, a circuit through line 312 will be completed to the lamp bulb 313 behind the red lens 185 and thence to opposite source 213 by line 314. The line 312 also is extended to a self-exhausting and solenoid-operated air valve 315 having a return circuit line 316 to line 213. The valve 315 is connected by supply conduit 317 to pressure source 225 and when activated, directs pressure through conduit 318 to the operating cylinder of spray gun 189. The supply conduit 225 is also connected to the nozzle portion of the spray gun by conduit or flexible tubing 319, the nozzle being connected to a source of water-soluble red dye by tubing 320. Thus, when a sheet of glass of uniform patterncut area and, by its weight, is determined to have a thickness between the tolerance range of .235 and .245 of an inch, the lamp bulb 313 will illuminate the red lens 185 and the valve 315 will operate the spray gun 189 to cause a stream of red dye to be sprayed on the glass as it is lifted and carried to the take-off area F.

On the other hand, if the sheet being weighed has a thickness between the tolerance range of .255 and .265 of an inch, the beam 165 will descend until the weight 166 has been moved sufficiently to bring about a balance at which instant the contact 167 thereon will be positioned to engage either of the pairs of contacts 174—175. When such engagement is effected, contact 167 by line 306 completes a circuit through either of switch arms 174'—175' and contact 180 by line 321 to the lamp bulb 322 and by line 323 to the opposite source 213. Bulb 322 illuminates the blue lens 187 while by circuit line 321, a circuit is further completed to a self-exhausting and solenoid-operated air valve 324 and thence to source 213 by line 325. Valve 324 is connected to supply conduit 225 and by flexible tubing 326 to spray gun 190. This spray gun nozzle is connected to the pressure source 225 by tubing 327 and to a source of water-soluble blue dye by tubing 328. Thus a sheet of glass which is above the average thickness but still within a desirable tolerance range will be designated by a spot of blue dye and when removed from the take-off section F can be placed with other sheets having this tolerance.

Glass sheets which will be found to have a thickness above .265 of an inch are of course acceptable for ultimate uses; however, these sheets will indicate by their weight that preceding operations have not removed sufficient glass during grinding and polishing or that the originally formed ribbon of glass was given too much thickness at the furnace forming rolls. In order that sheets above the tolerance range may be so designated, the beam 165 upon being moved further downwardly will cause further movement of the weight 166 thereon and consequently the contact 167 thereon will be positioned for ultimate engagement with either of the pairs of contacts 176—177. Then, through either of the switch arms 176'—177', a circuit from contact 167 and by line 306 and from contact 181 through line 329 will energize the solenoid 330 of relay switch 331, said solenoid having a return line 332 to opposite source 213. The armature 333 thereof carrying bar contacts 334 and 335 moves the same against spring 333' into engagement with pairs of fixed contacts 336 and 337 to complete a circuit from contacts 334—336 by line 338 from supply line 278 to line 339 which is connected by line 312 to lamp bulb 313 and air valve 315. Simultaneously, closed contacts 335—337 complete a circuit from line 338 to line 321 by line 340 to lamp bulb 322 and air valve 324. Thus, upon closure of the relay switch 331, the circuits of both bulbs 313—322 and air valves 315—324 will create illumination of both the red and blue lenses simultaneously with the spraying of the glass with red and blue dyes.

In the event that a glass sheet is too thin or beneath the low tolerance of thickness .235 of an inch and as determined from its weight, the beam 165 will not be operated to actuate any of the bulbs 310, 313, or 322 or either of the air valves 315 and 324. This will produce a delay which, however, is monitored by the timing relay 275 that, heretofore, was described as being adapted to function after an adjustably selected time interval of four or five seconds. The timing relay 275 receives its current supply from line 198 by line 341 and has a return to the opposite source 213 by way of line 342. The timing relay, however, will not function if the contact 167 on balance 166 has disengaged from contact 307 to disconnect a circuit therethrough from line 306 to line 308 which activates said relay. If, however, the relay 275 is so activated it completes a circuit by lines 343 and 280 to solenoid 281 of relay switch 276, this will maintain contacts 287—288 engaged and the valve 277 disposed so as to retain the frame 127 in its lowered position by means of the cylinder 147.

Timing relay 275 which is adapted to cease functioning upon the elapse of the adjusted time interval also energizes a timing relay 344 by line 345 from line 343 which is adapted to complete the circuits of bulb 346 and valve 347 to illuminate the lens 184 and operate spray gun 188. The relay 344 operates on a circuit line 348 from line 198 and return line 349 to line 213.

Accordingly after the timing relay 274 has ceased to function, the relay 275 will still maintain the solenoid 281 energized and the frame 127 lowered. Upon the expiration of this delay time interval, the circuit will be opened from the timer 275 through lines 341 and 343 from the supply line 198 to line 280. Substantially at the same time, timing relay 344 completes a circuit by line 348 from supply line 198 to line 350 and thereby to the bulb 346 and the air valve 347. The bulb 346, being situated in back of the yellow lens 184 illuminates the same, completing its circuit through line 351 to opposite source 213 while the air valve 347, completing its circuit by line 352 to line 213, actuates the spray gun 188. The valve is connected by conduit 353 to the supply conduit 225 and by the conduit or flexible tubing 354 to the operating cylinder of the spray gun 188. The spray nozzle thereof is connected to the air supply conduit 225 by tubing 355 and to a source of water-soluble yellow dye by tubing 356. Thus, as the frame 127 is raised by the direction of pressure to the lower side of the piston 149 in cylinder 147, a sheet of glass, which as determined by its weight is by thickness below the tolerance limit of .235 of an inch, will be denoted to the operator of the apparatus by the illuminated yellow lens 184 and legibly marked by the yellow dye sprayed thereon.

To briefly review the operation of an improved measuring apparatus, as constructed in accordance with the present invention, a plurality of sheets of material, such as glass, are placed on the chain-belts 25 of a production-line conveyor A. Each sheet has been pattern cut from an identical template and thus will have substantially the same square footage of surface area. Any variance between the sheets therefore will be caused by a difference in thickness and this will be, according to practice of this invention, evidenced by their difference in weight. Accordingly when a sheet S is carried into the entry section B, it operates the switches 63, 64 and 65 and electrical circuits are created to elevate the framework 32 by valve 222 and cylinder 48 and by the rollers 54 thereon raise the sheet from the pads 27 of chain-belts 25 and against the continuously operating rollers 69.

The sheet then is moved onto the rollers 86 of framework 87 in the intermediate section D, while the same is in its lowered position, and engages the switch 116. Switch 116 operates to open the described circuit of switch 63, if it is desired to alternately accept a sheet and then allow a second sheet to pass through the apparatus while supported on conveyor A, and also to complete a circuit generally to cylinder 111. This second circuit however is dependent upon the condition of switch 117 in take-off section F which switch will be opened at one side if a preceding sheet has not been removed.

During normal operating conditions, the switch 116 is effective to cause operation of the valve 246 and cylinder 111 and thereby the framework 87 to be elevated and the glass sheet S to be more or less instantly removed therefrom as it is raised against the continuously driven rollers 118. These rollers move the sheet onto the rollers 126 supported on the tiltable frame 127 and into engagement with the switch 145 in the weighing section E of the apparatus.

The switch 145 operates through relay 274, valve 277 and cylinder 147 to lower the frame 127 to deposit the glass sheet on the support members 142 of the frame 137 adapted to actuate the measuring beam 165. Switch 145 also activates timing relays 274 and 275 to initiate; first, a time interval for normal functioning of the measuring instrumentality and, second, a time interval in the event that a too light weight sheet of glass does not produce normal functioning.

During ordinary conditions of operation, the immediate sheet is measured by its weight and the bulbs 310, 313 or 322 and the spray guns 189 and 190 are accordingly operated to designate the range of thickness into which the sheet should be classified by illumination of the red, clear or blue lenses 185, 186 and 187 respectively and the related spraying of red or blue or red and blue dyes upon the glass. Upon expiration of the time interval monitored by the relay 274, the frame 127 is raised and the sheet directed into the take-off section F. However, should a preceding sheet still be in this section, the switch 117 through a holding circuit thereby established will prevent the cylinder 147 from raising the frame 127 and the sheet will remain on the supports 142 of the frame 137 until the rear end of the measuring apparatus has been cleared.

In the event that a glass sheet of uniform size is too light to operate the beam 165, the timing relay 274 ceases to function but the timing relay 275 continues to maintain the frame 127 in its lowered position for its adjusted time interval. When the relay 275 ceases to function, the above-described relay 344 operates to complete a circuit to the bulb 346 in back of the yellow lens 184 and also to the spray gun 188. This will direct yellow dye onto the glass so that it may be accordingly classified. Upon termination of the relay 275, the cylinder 147 is operated to raise the frame 127 so that the sheet will be removed with the exception that if the switch 117 is still activated, the frame will remain lowered as so described above.

Accordingly there is hereby provided a thickness measuring apparatus for uniform-sized sheets of material, said apparatus being adapted to function in a rapidly automatic manner and to be adjustable to denote any desired range of tolerances of thickness. The sheet materials entering such an apparatus in sequential, or in an alternative sequence of operation, produce a step-wise series of operations from one section of the apparatus to another, provision being made to control such step-wise operations to prevent collision of the sheets in any one of the later apparatus sections.

It is to be understood that the form of the invention disclosed herein is to be taken as the preferred embodiment thereof, and that various changes in the shape, size and arrangement of parts may be resorted to without departing from the spirit of the invention or the scope of the following claims.

We claim:

1. In an apparatus for measuring the thickness of sheets having a uniformly-sized surface area, said apparatus being arranged in the path of sheets carried along a substantially horizontal line of movement, supporting means for removing a sheet off such a line of movement and for moving the sheet laterally to a second supporting means, means for moving the sheet from the second supporting means to a third supporting means, the third supporting means being adapted to move a sheet from the forward to the rearward end thereof in step-wise sequences, a thickness measuring device located beneath the forward end of the third supporting means, means for lowering said third supporting means to place a sheet on the thickness measuring device, automatically controlled means for raising the third supporting member after a predetermined interval of time, and means associated with the thickness measuring device for automatically indicating the thickness of the sheet on the surface thereof as the same is being moved to the rearward end of the third supporting member.

2. Apparatus for determining the thickness of individual sheets having predetermined surface areas, comprising a first conveyor for moving the sheets along a definite path, a second conveyor for receiving selected sheets from said first conveyor, transfer means to movably lift a sheet from said first conveyor and urge it into engageable relation with said second conveyor, thickness measuring means adjacent said second conveyor for measuring the thickness of said sheets and means for receiving successive sheets from said second conveyor and moving them into measuring relation with said thickness measuring means, said second conveyor adapted to contact the sheet on the upper surface of the sheet.

3. Apparatus for determining the thickness of sheets as claimed in claim 2 including means for restricting transfer of additional sheets from said first conveyor to said second conveyor when a sheet is being carried by said second conveyor.

4. Apparatus for determining the thickness of sheets having predetermined surface areas, comprising a conveyor for moving the sheets along a definite path, a support table mounted adjacent said conveyor and operable to move away from said conveyor to remove a sheet from said conveyor when the thickness of a preceding sheet is being determined, a measuring station mounted adjacent the path of the sheets, said measuring station including a weighing device and means connected to said weighing device for determining the thickness of said sheets from the weight thereof, a sheet receiving device provided at said weighing station, said receiving device being movable to deposit a sheet on said weighing device and to remove it therefrom, and means operably connected to said support table and said receiving device for moving them in timed relation with respect to one another to enable said sheets to move along said path in a definite timed sequence.

5. Apparatus for determining the thickness of sheets as claimed in claim 4, in which means are provided for indicating on said sheets the thickness thereof.

6. Apparatus for determining the thickness of sheets having predetermined surface areas, comprising a conveyor for moving a sheet along a definite path, thickness measuring means, acting in timed relationship to said conveyor, adjacent said conveyor for measuring the thickness of said sheet, said thickness measuring means including weighing means and means for relating the weight of said sheet to the thickness thereof, a receiving device for receiving said sheet from said conveyor and for moving it into measuring relation with said thickness measuring means, and means for preventing movement of an additional sheet onto the receiving device when a sheet is resting thereon.

7. Apparatus for determining the thickness of sheets having predetermined surface areas, comprising a conveyor for moving a sheet along a definite path, thickness measuring means adjacent said conveyor for measuring the thickness of said sheet, a receiving device for receiving a sheet from said conveyor and for moving it into measuring relation with said thickness measuring means, said receiving device being pivotally mounted and operable to deposit said sheet on said thickness measuring means and to remove said sheet from said measuring means, and means operably connected to said receiving device for maintaining said receiving device in a lower position when a sheet which has been measured has not been removed from the apparatus.

8. Apparatus for determining the thickness of sheets as claimed in claim 7 wherein said thickness measuring means includes a spray device mounted above the path of said sheets for spraying an indicia of the thickness on a particular sheet when it is in a particular thickness range.

9. Apparatus for determining the thickness of sheets having predetermined surface areas, comprising a conveyor for moving a sheet along a definite path, thickness measuring means adjacent said conveyor for measuring the thickness of said sheet, a receiving device for receiving a sheet from said conveyor and for moving it into measuring relation with said thickness measuring means, said receiving device operable to deposit said sheet on said thickness measuring means and to remove said sheet from said measuring means, and means operably connected to said receiving device for maintaining said receiving device in a lower position when a sheet which has been measured has not been removed from the apparatus.

10. Apparatus for determining the thickness of sheet material having predetermined surface areas, comprising, conveyor means for moving the sheets along a definite path, thickness indicating means, adjacent said conveyor means, responsive to the weight of each sheet and adapted to weigh each sheet individually to indicate the thickness of each sheet, means for receiving successive sheets from said conveyor means said receiving means adapted to move each sheet into weighing relation with respect to said thickness indicating means and control means to prevent a subsequent sheet from moving onto said conveyor means and to said receiving means when a prior sheet is positioned in contact with said receiving means, said control means moving the subsequent sheet onto said conveyor means and to said receiving means only after the prior named sheet is removed from said sheet receiving means.

References Cited in the file of this patent

UNITED STATES PATENTS

| | | |
|---|---|---|
| 384,332 | Oliver | June 12, 1888 |
| 923,356 | Hove | June 1, 1909 |
| 1,132,840 | Garrett | Mar. 23, 1915 |
| 2,008,200 | Clauss | July 16, 1935 |
| 2,064,858 | Rieger | Dec. 22, 1936 |
| 2,101,260 | Luhn | Dec. 7, 1937 |
| 2,104,546 | Pennell | Jan. 4, 1938 |
| 2,124,678 | Talbot | July 26, 1938 |
| 2,169,897 | Lueckel | Aug. 15, 1939 |
| 2,515,412 | Lee | July 18, 1950 |
| 2,646,881 | Boyer | July 28, 1953 |

FOREIGN PATENTS

| | | |
|---|---|---|
| 696,795 | Great Britain | Sept. 9, 1953 |